United States Patent
Gizaw et al.

(10) Patent No.: US 10,781,406 B2
(45) Date of Patent: Sep. 22, 2020

(54) METHODS OF REDUCTION PREVENTING OR REMOVING BIOFILMS

(71) Applicant: The Procter & Gamble Company, Cincinnati, OH (US)

(72) Inventors: Yonas Gizaw, West Chester, OH (US); Roy Jerome Harrington, Liberty Township, OH (US); Peter Herbert Koenig, Montgomery, OH (US); Samuel Kimani Njoroge, Cincinnati, OH (US); Jamesina Anne Fitzgerald, Trenton, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 208 days.

(21) Appl. No.: 15/729,730

(22) Filed: Oct. 11, 2017

(65) Prior Publication Data

US 2018/0100083 A1 Apr. 12, 2018

Related U.S. Application Data

(60) Provisional application No. 62/406,436, filed on Oct. 11, 2016.

(51) Int. Cl.
| | | |
|---|---|---|
| C09D 133/24 | (2006.01) | |
| C11D 3/37 | (2006.01) | |
| C11D 3/00 | (2006.01) | |
| C11D 3/43 | (2006.01) | |
| C11D 3/48 | (2006.01) | |
| C11D 17/04 | (2006.01) | |
| A47L 13/17 | (2006.01) | |
| C11D 1/825 | (2006.01) | |
| C11D 1/72 | (2006.01) | |
| C11D 1/75 | (2006.01) | |

(52) U.S. Cl.
CPC ............ *C11D 3/3773* (2013.01); *A47L 13/17* (2013.01); *C09D 133/24* (2013.01); *C11D 1/825* (2013.01); *C11D 3/0036* (2013.01); *C11D 3/3742* (2013.01); *C11D 3/3769* (2013.01); *C11D 3/43* (2013.01); *C11D 3/48* (2013.01); *C11D 17/049* (2013.01); *C11D 1/72* (2013.01); *C11D 1/75* (2013.01)

(58) Field of Classification Search
CPC .. A61K 8/8164; A61K 8/8147; A61K 8/8152; A61K 8/89; C11D 3/3769; C09D 133/24
See application file for complete search history.

(56) References Cited

U.S. PATENT DOCUMENTS

| | | | | |
|---|---|---|---|---|
| 4,687,792 A | * | 8/1987 | Russell ................ | C09D 5/1668 106/16 |
| 5,476,912 A | * | 12/1995 | Hosoi .................. | A61K 6/0026 526/279 |
| 2008/0038241 A1 | * | 2/2008 | Schasfoort ........... | C09D 5/1625 424/94.3 |
| 2008/0075960 A1 | * | 3/2008 | Pocius ................. | C09D 5/1668 428/446 |
| 2009/0214672 A1 | * | 8/2009 | Ramesh ................. | A01N 59/00 424/661 |
| 2011/0257289 A1 | * | 10/2011 | Biggs .................. | C08F 293/005 523/102 |

FOREIGN PATENT DOCUMENTS

| | | | | |
|---|---|---|---|---|
| JP | 08-269389 | * | 10/1996 | ........... C09D 143/04 |
| WO | WO84/02915 | * | 8/1984 | ................ C09J 3/00 |

* cited by examiner

*Primary Examiner* — Monique R Peets
(74) *Attorney, Agent, or Firm* — John T. Dipre

(57) ABSTRACT

Use of a copolymer to reduce the development of biofilm on a surface and/or to increase removal ease of removal of a biofilm from a surface.

11 Claims, No Drawings

METHODS OF REDUCTION PREVENTING OR REMOVING BIOFILMS

FIELD OF THE INVENTION

The present invention relates to methods for reduction of microorganism adhesion and/or biofilm formation. The invention also relates to improving biofilm and/or microorganism cleaning or removal from surfaces.

BACKGROUND OF THE INVENTION

A biofilm forms when microorganisms in the presence of water/moisture attach loosely to a surface and begin to adhere by excreting sticky substances or extrapolymeric substances (EPS). Glycocalyx is a network of polysaccharides that projects from a cellular surface of a bacteria and which traps essential minerals and nutrients for microorganisms, leading to more sticky EPS. These sticky substances then adhere much more strongly onto the surface causing a biofilm build-up that is difficult to remove, even with physical stress. Furthermore, biofilm serves as a media for many species of bacteria and may also include fungi, yeasts, algae and protozoa, and their reproductive or fruiting bodies, such as spores, cysts, oocysts, etc. Biofilm build-up is particularly problematic in cleaning, both domestic cleaning and commercial or institutional cleaning: for example, laundry and automotive fabrics; hard surfaces such as floors, countertops, bath and shower-room surfaces, fountains, pool surfaces and toilets; cleaning equipment such as washing machines for dish and/or laundry cleaning; refrigerators, ice machines, rubbish bins and other refuse containers; and also in the area of oral care, particularly for dentures. Biofilm is also a problem in the cleaning and maintenance of medical devices and instrumentations, water treatment and other industrial processes where high humidity or an aqueous environment is present and in the marine industries such as shipping and underwater agriculture.

Surface modification to reduce biofilm formation is disclosed in US2010/0249249. An alternative to biocides is proposed which is said to provide biorepulsive substances to reduce microbial attachment and prevent adhesion of microorganisms to surfaces, thereby reducing biofilm formation. The invention disclosed deposits copolymers comprising anionic vinyl monomers, thereby repelling the negatively charged microorganisms so that their deposition is reduced whilst not physiologically impairing the microorganisms.

However, there is still a need for methods of reducing build-up of biofilm. Furthermore, in the event that biofilm does build up, methods of increasing ease of removal are also needed. The present inventors have learned that through topical modification of hard and soft surfaces (e.g. changing hydrophobicity, surface energy, contact angles, etc.), by exposing the surface to a combination of certain polymers and certain solvents, both biofilm build-up and the architecture of a biofilm can be changed, such that biofilm build-up is reduced, the tenacity by which the biofilm adheres to the surface is weakened and/or the physical architecture of the biofilm is changed so that the biofilm can be more easily removed and/or its exposure to antimicrobial and/or cleaning chemistry may be increased. Whilst not wishing to be bound by theory it is believed that this may be because the glycocalyx, anchors to the polymer/solvent, rather than directly onto the surface and the number of the adhesion sites is reduced.

SUMMARY OF THE INVENTION

According to a first aspect of the invention, there is provided a method for reducing adhesion of microorganisms and/or for reducing the development of biofilm on a surface and/or for increasing ease of cleaning of a biofilm from a surface, comprising the step of applying a composition to the surface wherein the composition comprises:

(a) A hydrophobically modified cationic polymer having the formula:

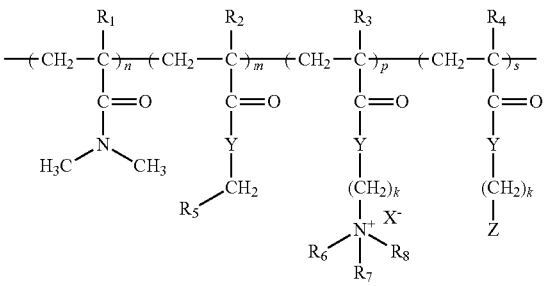

wherein:
n, m, p, and s are the mole percent of the respective monomers, such that:
n is from 95 to 99.5;
m is from 0.5 to 5;
p is from 0 to 4.5;
s is from 0 to 4.5;
$R_1$, $R_2$, $R_3$, and $R_4$ are independently H or $CH_3$;
$R_5$ is an alkyl group from C7 to C21;
$R_6$, $R_7$, $R_8$, are independently selected from the group consisting of: hydrogen and C1 to C4 alkyl;
Y is independently O or NH;
Z is silicone or a derivative thereof;
k is independently from 1 to 18;
$X^-$ is an anion, preferably $Cl^-$, $Br^-$, $I^-$, $HSO_4^-$, $CH_3SO_4^-$, $C_2H_5SO_4^-$, or $OH^-$;
and
(b) a solvent.

Preferably n is from 96.5 to 99.5. Preferably m is from 0.5 to 2. Preferably p is from 0.5 to 3. Preferably s is 0. In a specially preferred polymer n is 97, m is 1 and p is 2. In another preferred polymer n is 99, m is 1 and p is 0. Preferably R5 is C18, R6 is H, and $R_7$, $R_8$, are independently selected from the group consisting of: methyl, ethyl, and propyl.

Preferably, the polymer has a molecular weight of from 100,000 to 500,000 Daltons.

Preferably, the solvent is selected from alkylene glycol ethers and mixtures thereof. A specially preferred solvent for use herein is propylene glycol n-butyl ether. Specially preferred compositions for use herein comprise from 0.01 to 1% by weight of the composition of the polymer and from 0.1 to 1% by weight of the composition of the solvent.

It has been found that compositions comprising:
(a) from 0.01 to 1% by weight of the composition of the polymer in particular when in the polymer n is 97, m is 1 and p is 2 or n is 99, m is 1 and p is 0; and
(b) from 0.1 to 1% by weight of the composition of the solvent when the solvent is propylene glycol n-butyl ether.

are particularly good for for reducing adhesion of microorganisms and/or for reducing the development of biofilm on a surface and/or for increasing ease of cleaning of a biofilm from a surface According to a second aspect of the invention there is provided the use of a composition comprising a polymer and a solvent to reduce the development of biofilm on a surface and/or to increase ease of cleaning or removal of a biofilm from a surface. Suitable surfaces include soft surfaces including fabrics made from cotton, wool, silk, polyester, nylon, lycra and other synthetic fabrics and mixtures thereof, in particular synthetic fibre-containing fabrics. Suitable surfaces include hard surfaces in contact with water or moist environments, particularly hard surfaces in the home, for example floors, kitchens and bathrooms.

The elements of the first aspect of the invention apply mutatis mutandis to the second aspect of the invention.

DETAILED DESCRIPTION OF THE INVENTION

The present invention provides a method for reducing adhesion of microorganisms and/or for reducing the development of biofilm on a surface and/or for increasing ease of cleaning of a biofilm from a surface using a composition comprising a polymer and a solvent. There is also provided the use of a composition for reducing adhesion of microorganisms and/or for reducing the development of biofilm on a surface and/or for increasing ease of cleaning of a biofilm from a surface.

The composition for use in the method of the invention is sometimes herein referred to as "the composition of the invention".

All percentages, ratios and proportions used herein are by weight percent of the composition, unless relating to the polymer or otherwise specified. All average values are calculated "by weight" of the composition, unless otherwise expressly indicated.

All measurements are performed at 25° C. unless otherwise specified.

Unless otherwise noted, all component or composition levels are in reference to the active portion of that component or composition, and are exclusive of impurities, for example, residual solvents or by-products, which may be present in commercially available sources of such components or compositions.

The composition for use in the method of the invention comprises a hydrophobically modified cationic polymer and a solvent. The composition is preferably a liquid composition, more preferably a liquid hard surface cleaning composition.

Hydrophobically Modified Cationic Polymer:

The composition comprises a hydrophobically modified cationic polymer having the formula:

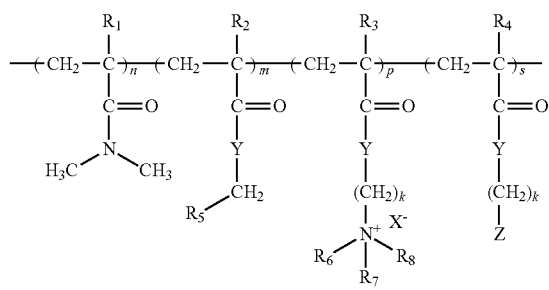

wherein:
n, m, p, and s are the mole percent of the respective monomers, such that:
n is from 95 to 99.5, preferably from 96 to 99, more preferably 97 or 99;
m is from 0.5 to 5, preferably from 0.5 to 2, more preferably 1;
p is from 0 to 4.5, preferably p is from 0 or 2;
s is from 0 to 4.5, preferably from 0; and
$R_1$, $R_2$, $R_3$, and $R_4$ are independently H or $CH_3$;
$R_5$ is an alkyl group from C7 to C21, preferably $R_5$ is an alkyl group from C16 to C20, more preferably C18;
$R_6$, $R_7$, $R_8$, are independently selected from the group consisting of: hydrogen and C1 to C4 alkyl; $R_6$ is preferably H, and $R_7$, $R_8$, are preferably independently selected from the group consisting of: methyl, ethyl, and propyl;
Y is independently O or NH;
Z is silicone or a derivative thereof; Z can be a silicone or derivative selected from the group consisting of a polydimethylsiloxane, an aminosilicone, a cationic silicone, a silicone polyether, a cyclic silicone, a fluorinated silicone and mixtures thereof, preferably Z is polydimethylsiloxane; Z can be a silicone or derivative having a molecular weight of from 250 to 40,000, preferably 500 to 20,000, more preferably 1,000 to 10,000 Da;
k is independently from 1 to 12, preferably from 2 to 8, more preferably from 2 to 5; and
$X^-$ is an anion, preferably $Cl^-$, $Br^-$, $I^-$, $HSO_4^-$, $CH_3SO_4^-$, $C_2H_5SO_4^-$, or $OH^-$.

In preferred embodiments, m is at least 0.01, and s is 0.

The hydrophobically modified cationic polymer has a molecular weight of less than 1,500,000 Daltons, preferably from 100,000 to 500,000 Daltons.

Solvent:

The composition comprises a solvent, especially a non-aqueous solvent. Suitable solvents include hydrocarbons, terpenes, terpene derivatives, terpinoids, terpenoid derivatives, alcohols, typically having from 3 to 14 carbon atoms, such as methanol, ethanol, n-propanol, isopropanol, butanol, pentanol, hexanol and isomers thereof; polyalkylene glycols and alkylene glycol ethers, typically in which the alkylene group has from 2 to 14, preferably from 2 to 10 carbon atoms, such as propylene glycol n-butyl ether, tripropylene glycol methyl ether, dipropylene glycol n-propyl ether, dipropylene glycol n-butyl ether, tripropylene glycol n-butyl ether, diethylene glycol n-butyl ether (Butyl carbitol), diethylene glycol hexyl ether (hexyl Carbitol), diethylene glycol n-butyl ether acetate (butyl carbitol acetate), ethylene glycol hexyl ether (hexyl cellosolve), triethylene glycol methyl ether (methoxytriglycol), triethylene glycol ethyl ether (ethoxytriglycol), triethylene glycol n-butyl ether (butoxytriglycol), Ucar filmer ibt, trimethylnonanol, propylene glycol diacetate, dipropylene glycol methyl ether and mixtures thereof. Preferred solvents are alkylene glycol ethers. The preferred solvent for use in the composition of the invention is propylene glycol n-butyl ether. The solvent may be present at a level of from 0.005 wt % to 10 wt % by weight of the total composition of said solvent, preferably from 0.01 wt % to 7.0 wt %, more preferably from 0.025 wt % to 5.5 wt % and most preferably from 0.25 wt % to 2.0 wt %. Especially good for reducing adhesion of microorganisms and/or for reducing the development of biofilm on a surface and/or for increasing ease of cleaning of a biofilm from a surface are compositions comprising from 0.05% to 0.5 wt % of the polymer and from 0.05 to 2 wt % of the solvent. Particularly when the in the polymer n is 97, m is 1 and p is 2 or n is 99, m is 1 and p is 0 and the solvent is propylene glycol n-butyl ether.

The combination of the solvent and hydrophobically modified polymer results in a composition which is also low sudsing, and improves the loosening and removal of soils. It is believed that the combination of solvent and polymer also improves the distribution and deposition of the polymer onto the hard surface, and improves the wetting and emulsification of the soil off the treated surface.

Compositions

The composition for use in the method of the invention is preferably a liquid composition, more preferably a liquid cleaning composition.

The composition preferably comprises from 0.05 to 10 wt % or from 0.08 to 5 wt % or from 0.1 to 3 wt %, more preferably from 0.09 to 1 wt % of polymer, from 0.1 to 5 wt %, preferably from 0.2 to 2 wt % of solvent and optional ingredients. The composition may be a cleaning and/or treatment composition for hard and/or soft surfaces for use in any aqueous or humid environment, such as household cleaning and/or treatment including dish, hard surface and fabric cleaning and/or treatment, oral care, medical devices, aqueous industrial applications including air conditioning systems, water treatment and marine applications. The composition may be in solid form such as particulate or tablet form, or in the form of a liquid or gel, polish, cream, lipid emulsion. The composition may also be in unit dose form, for dissolution in water, for example in the form of a pouch optionally made from water-soluble film and optionally being a multi-compartment pouch.

Examples of optional ingredients include surfactants including anionic surfactants, non-ionic surfactants, cationic surfactants, zwitterionic surfactants, amphoteric surfactants, and any combination thereof; polymers including carboxylate polymers, polyethylene glycol polymers, polyester soil release polymers such as terephthalate polymers, amine polymers, cellulosic polymers, dye transfer inhibition polymers, dye lock polymers such as a condensation oligomer produced by condensation of imidazole and epichlorhydrin, optionally in ratio of 1:4:1, hexamethylenediamine derivative polymers, and any combination thereof; builders including zeolites, phosphates, citrate, and any combination thereof; buffers and alkalinity sources including carbonate salts and/or silicate salts; fillers including sulphate salts and bio-filler materials; bleach including bleach activators, sources of available oxygen, pre-formed peracids, bleach catalysts, reducing bleach, and any combination thereof; chelants; photobleach; hueing agents; brighteners; enzymes including proteases, amylases, cellulases, lipases, xyloguca-nases, pectate lyases, mannanases, bleaching enzymes, cutinases, and any combination thereof; fabric softeners including clay, silicones, quaternary ammonium fabric-softening agents, and any combination thereof; flocculants such as polyethylene oxide; dyes; perfume including starch encapsulated perfume accords, perfume microcapsules, perfume loaded zeolites, Schiff base reaction products of ketone perfume raw materials and polyamines, blooming perfumes, and any combination thereof. Particularly preferred optional ingredients are selected from surfactants and solvents and mixtures thereof.

In a preferred aspect the polymer/solvent are present in a hard surface cleaning composition which is applied to the surface to be treated. Hard surface cleaning compositions are used for cleaning and treating hard surfaces. Preferably, the hard surface cleaning composition is formulated to be an "all purpose" hard surface cleaning composition. That is, the hard surface cleaning composition is formulated to be suitable for cleaning as many different kinds of surfaces as possible. Preferably the cleaning composition is a liquid, such as a hard surface cleaning liquid.

By "liquid hard surface cleaning composition", it is meant herein a liquid composition for cleaning hard surfaces found, for example, in households, especially domestic households. Surfaces to be cleaned include kitchens and bathrooms, e.g., floors, walls, tiles, windows, cupboards, sinks, showers, shower plastified curtains, wash basins, WCs, fixtures and fittings, and the like made of different materials like ceramic, vinyl, no-wax vinyl, linoleum, melamine, glass, steel, kitchen work surfaces, any plastics, plastified wood, metal, wood such as wood floors and wood furniture, or any painted or varnished or sealed surface and the like. Household hard surfaces also include household appliances including, but not limited to refrigerators, freezers, washing machines, automatic dryers, ovens, microwave ovens, dishwashers and so on. Such hard surfaces may be found both in private households as well as in commercial, institutional and industrial environments. Other surfaces to be cleaned include automobile surfaces such as car glass and automobile bodies.

In a preferred embodiment, the liquid compositions herein are aqueous compositions. Therefore, they may comprise from 30% to 99% by weight of the total composition of water, preferably from 50% to 98% and more preferably from 80% to 97%.

For "all purpose" hard surface cleaning compositions, the pH is preferably from 7.0 to 12, more preferably from 7.5 to 11.5, even more preferably from 9.5 to 11.3, most preferably 10 to 11. It is believed that greasy soil and particulate greasy soil cleaning performance is improved at these preferred alkaline pH ranges. Accordingly, the compositions herein may further comprise an acid or base to adjust pH as appropriate. For improved limescale removal, a pH of less than 7 is preferred, for example from 1 to 6, more preferably from 2.0 to 4.0, still more preferably from 2.5 to 3.7, and most preferably from 2.1 to 2.4. The pH of the cleaning compositions is measured at 25° C. Typically, the acid system may comprise any organic or inorganic acid well-known to those skilled in the art, or a mixture thereof. In preferred embodiments, the acid system comprises acids selected from the group consisting of: citric acid, formic acid, acetic acid, maleic acid, lactic acid, glycolic acid, succinic acid, glutaric acid, adipic acid, sulphamic acid, sulphuric acid, hydrochloric acid, phosphoric acid, nitric acid, methane sulphonic acid, and mixtures thereof, preferably acids selected from the group consisting of: citric acid, formic acid, acetic acid, lactic acid, phosphoric acid, and mixtures thereof. Formic acid is particularly preferred as part of the acid system. Formic acid has been found to provide excellent limescale removal performance, in combination with improved surface safety, especially for surfaces which are prone to corrosion. The composition preferably comprises the acid system at a level of from 0.01% to 15%, preferably from 0.5% to 10%, more preferably from 2% to 8%, most preferably from 4% to 7.5% by weight of the total composition.

The acidic hard surface cleaning composition may also comprise an alkaline material, so long as the overall pH remains acidic. Examples of alkaline materials are sodium hydroxide, potassium hydroxide and/or lithium hydroxide, and/or the alkali metal oxides such, as sodium and/or potassium oxide or mixtures thereof and/or monoethanolamine and/or triethanolamine. Other suitable bases include ammonia, ammonium carbonate, $K_2CO_3$, $Na_2CO_3$ and alkanolamines (such as monoethanolamine, triethanolamine, aminomethylpropanol, and mixtures thereof). Typically the amount of alkaline material is of from 0.001% to 20% by weight, preferably from 0.01% to 10% and more preferably from 0.05% to 3% by weight of the composition. Other suitable bases include ammonia, ammonium carbonate, choline base, etc. Typical levels of such bases, when present, are from 0.01% to 5.0% by weight of the total composition, preferably from 0.05% to 3.0% and more preferably from 0.1% to 2.0%.

All ratios are calculated as a weight/weight level, unless otherwise specified.

Detersive Surfactant:

The compositions comprising the polymer/solvent preferably comprise a surfactant. Suitable surfactants can be selected from the group consisting of: anionic surfactants, nonionic surfactants, amphoteric surfactants, zwitterionic surfactants, and mixtures thereof. Preferred detersive surfactants are: anionic surfactants, nonionic surfactants, and mixtures thereof. The total amount of surfactant can be present at a level of from 0.00025 wt % to 30 wt %, preferably from 0.002 wt % to 20 wt %, more preferably from 0.004 wt % to 10.0 wt %, most preferably from 0.01 wt % to 1 or 0.75 wt % of the composition.

Suitable nonionic surfactant can be selected from the group consisting of: alkoxylated nonionic surfactants, alkyl polyglycosides, amine oxides, and mixture thereof. Typically, the liquid hard surface cleaning composition may comprise from 0.00025 wt % to 15 wt % by weight of the total composition of said nonionic surfactant, preferably from 0.002 wt % to 7 wt %, more preferably from 0.004 wt % to 3.0 wt % and most preferably from 0.01 wt % to 0.65 wt %. The composition can comprise from 0.00025 wt % to 10.0 wt % by weight of the total composition of alkoxylated alcohol, preferably ethoxylated alcohol, preferably from 0.0008 wt % to 5.0 wt %, more preferably from 0.0019 wt % to 1.0 wt % and most preferably from 0.0035 wt % to 0.5 wt %.

Suitable alkoxylated nonionic surfactants include primary $C_6$-$C_{16}$ alcohol polyglycol ether i.e. ethoxylated alcohols having 6 to 16 carbon atoms in the alkyl moiety and 4 to 30 ethylene oxide (EO) units. When referred to for example $C_{9-14}$ it is meant average carbons and alternative reference to for example EO8 is meant average ethylene oxide units.

Suitable alkoxylated nonionic surfactants are according to the formula RO-(A)$_n$H, wherein: R is a $C_6$ to $C_{18}$, preferably a $C_8$ to $C_{16}$, more preferably a $C_8$ to $C_{12}$ alkyl chain, or a $C_6$ to $C_{28}$ alkyl benzene chain; A is an ethoxy or propoxy or butoxy unit, and wherein n is from 1 to 30, preferably from 1 to 15 and, more preferably from 4 to 12 even more preferably from 5 to 10. Preferred R chains for use herein are the $C_8$ to $C_{22}$ alkyl chains. Even more preferred R chains for use herein are the $C_9$ to $C_{12}$ alkyl chains. R can be linear or branched alkyl chain. Suitable ethoxylated nonionic surfactants for use herein are Dobanol® 91-2.5 (HLB=8.1; R is a mixture of $C_9$ and $C_{11}$ alkyl chains, n is 2.5), Dobanol® 91-10 (HLB=14.2; R is a mixture of $C_9$ to $C_{11}$ alkyl chains, n is 10), Dobanol® 91-12 (HLB=14.5; R is a mixture of $C_9$ to $C_{11}$ alkyl chains, n is 12), Greenbentine DE80 (HLB=13.8, 98 wt % C10 linear alkyl chain, n is 8), Marlipal 10-8 (HLB=13.8, R is a C10 linear alkyl chain, n is 8), Lialethl® 11-5 (R is a $C_{11}$ alkyl chain, n is 5), Isalchem® 11-5 (R is a mixture of linear and branched C11 alkyl chain, n is 5), Lialethl® 11-21 (R is a mixture of linear and branched $C_{11}$ alkyl chain, n is 21), Isalchem® 11-21 (R is a $C_{11}$ branched alkyl chain, n is 21), Empilan® KBE21 (R is a mixture of $C_{12}$ and $C_{14}$ alkyl chains, n is 21) or mixtures thereof. Preferred herein are Dobanol® 91-5, Neodol® 11-5, Lialethl® 11-21 Lialethl® 11-5 Isalchem® 11-5 Isalchem® 11-21 Dobanol® 91-8, or Dobanol® 91-10, or Dobanol® 91-12, or mixtures thereof. These Dobanol®/Neodol® surfactants are commercially available from SHELL. These Lutensol® surfactants are commercially available from BASF and these Tergitol® surfactants are commercially available from Dow Chemicals.

Suitable chemical processes for preparing the alkoxylated nonionic surfactants for use herein include condensation of corresponding alcohols with alkylene oxide, in the desired proportions. Such processes are well known to the person skilled in the art and have been extensively described in the art, including the OXO process and various derivatives thereof. Suitable alkoxylated fatty alcohol nonionic surfactants, produced using the OXO process, have been marketed under the tradename NEODOL® by the Shell Chemical Company. Alternatively, suitable alkoxylated nonionic surfactants can be prepared by other processes such as the Ziegler process, in addition to derivatives of the OXO or Ziegler processes.

Preferably, said alkoxylated nonionic surfactant is a $C_{9-11}$ EO5 alkylethoxylate, $C_{12-14}$ EO5 alkylethoxylate, a $C_{11}$ EO5 alkylethoxylate, $C_{12-14}$ EO21 alkylethoxylate, or a $C_{9-11}$ EO8 alkylethoxylate or a mixture thereof. Most preferably, said alkoxylated nonionic surfactant is a $C_{11}$ EO5 alkylethoxylate or a $C_{9-11}$ EO8 alkylethoxylate or a mixture thereof. Suitable nonionic surfactants include alkyl polyglycosides are biodegradable nonionic surfactants which are well known in the art. Suitable non-ionic surfactants include alkyl polyglycosides can have the general formula $C_n H_{2n+1} O(C_6H_{10}O_5)_x H$ wherein n is preferably from 9 to 16, more preferably 11 to 14, and x is preferably from 1 to 2, more preferably 1.3 to 1.6. Such alkyl polyglycosides provide a good balance between anti-foam activity and detergency. Alkyl polyglycoside surfactants are commercially available in a large variety. An example of a very suitable alkyl poly glycoside product is Planteren APG 600, which is essentially an aqueous dispersion of alkyl polyglycosides wherein n is about 13 and x is about 1.4. Suitable amine oxide surfactants include: $R_1R_2R_3NO$ wherein each of $R_1$, $R_2$ and $R_3$ is independently a saturated or unsaturated, substituted or unsubstituted, linear or branched hydrocarbon chain having from 10 to 30 carbon atoms. Preferred amine oxide surfactants are amine oxides having the following formula: $R_1R_2R_3NO$ wherein $R_1$ is an hydrocarbon chain comprising from 1 to 30 carbon atoms, preferably from 6 to 20, more preferably from 8 to 16 and wherein $R_2$ and $R_3$ are independently saturated or unsaturated, substituted or unsubstituted, linear or branched hydrocarbon chains comprising from 1 to 4 carbon atoms, preferably from 1 to 3 carbon atoms, and more preferably are methyl groups. $R_1$ may be a saturated or unsaturated, substituted or unsubstituted linear or branched hydrocarbon chain. Preferably, the composition comprises from 0.00025 wt % to 2.0 wt %, preferably from 0.0005 wt % to 1.0 wt %, more preferably from 0.001 wt % to 0.5 wt % and most preferably from 0.0025 wt % to 0.25 wt % of the composition of amine oxide surfactant. A highly preferred amine oxide is $C_{12}$-$C_{14}$ dimethyl amine oxide, commercially available from Albright & Wilson, $C_{12}$-$C_{14}$ amine oxides commercially available under the trade name Genaminox® LA from Clariant or AROMOX® DMC from AKZO Nobel.

The nonionic surfactant is preferably a low molecular weight nonionic surfactant, having a molecular weight of less than 950 g/mol, more preferably less than 500 g/mol.

For hard surface cleaning compositions preferably, the composition comprises less than 1.0 wt %, more preferably less than 0.2 wt %, even more preferably, less than 0.05 wt % of anionic surfactant. Most preferably, the composition is essentially free of, or free of, anionic surfactant. If used, suitable anionic surfactants include an alkyl sulphate, an alkyl alkoxylated sulphate, a sulphonic acid or sulphonate surfactant, and mixtures thereof.

The hard surface cleaning composition may comprise up to 3.0 wt % of an additional surfactant, preferably selected from: an amphoteric, zwitterionic, and mixtures thereof. More preferably, the hard surface cleaning composition can comprise from 0.005 wt % to 1.5 wt %, or from 0.001 wt % to 0.5 wt %, or from 0.0025 wt % to 0.25*wt % by weight of the additional surfactant.

Suitable zwitterionic surfactants typically contain both cationic and anionic groups in substantially equivalent proportions so as to be electrically neutral at the pH of use. The typical cationic group is a quaternary ammonium group, other positively charged groups like phosphonium, imidazolium and sulfonium groups can be used. The typical anionic hydrophilic groups are carboxylates and sulfonates, although other groups like sulfates, phosphonates, and the like can be used.

Some common examples of zwitterionic surfactants include betaine and sulphobetaine surfacants.

Additional Polymers

The composition may comprise an additional polymer. It has been found that the presence of a specific polymer as described herein, when present, allows further improving the grease removal performance of the liquid composition due to the improved emulsification of the greasy soil. The additional polymer can be selected from the group consisting of: a vinylpyrrolidone homopolymer (PVP); a polyethyleneglycol dimethylether (DM-PEG); a vinylpyrrolidone/dialkylaminoalkyl acrylate or methacrylate copolymers; a polystyrenesulphonate polymer (PSS); a poly vinyl pyridine-N-oxide (PVNO); a polyvinylpyrrolidone/vinylimidazole copolymer (PVP-VI); a polyvinylpyrrolidone/polyacrylic acid copolymer (PVP-AA); a polyvinylpyrrolidone/vinylacetate copolymer (PVP-VA); a polyacrylic polymer or polyacrylicmaleic copolymer; and a polyacrylic or polyacrylic maleic phosphono end group copolymer; and mixtures thereof.

The composition may comprise from 0.001 wt % to 2.25 wt % by weight of the total composition of said polymer, preferably from 0.0025 wt % to 2.0 wt %, more preferably from 0.01 wt % to 1.75 wt % and most preferably from 0.05 wt % to 1.5 wt %.

Thickener

The composition may comprise a thickener. An increased viscosity, especially low shear viscosity, provides longer contact time and therefore improved penetration of greasy soil and/or particulate greasy soil to improve cleaning effectiveness, especially when applied neat to the surface to be treated. Hence, preferably, the liquid hard surface cleaning composition, comprising a thickener, has a viscosity of from 50 Pa·s to 650 Pa·s, more preferably 100 Pa·s to 550 Pa·s, most preferably 150 Pa·s to 450 Pa·s, at 20° C. when measured with a AD1000 Advanced Rheometer from Atlas® shear rate 10 $s^{-1}$ with a coned spindle of 40 mm with a cone angle 2° and a truncation of ±60 μm.

Suitable thickeners include polyacrylate based polymers, preferably hydrophobically modified polyacrylate polymers; hydroxyl ethyl cellulose, preferably hydrophobically modified hydroxyl ethyl cellulose, xanthan gum, hydrogenated castor oil (HCO) and mixtures thereof. Preferred thickeners are polyacrylate based polymers, preferably hydrophobically modified polyacrylate polymers. Preferably a water soluble copolymer based on main monomers acrylic acid, acrylic acid esters, vinyl acetate, methacrylic acid, acrylonitrile and mixtures thereof, more preferably copolymer is based on methacrylic acid and acrylic acid esters having appearance of milky, low viscous dispersion. Most preferred hydrologically modified polyacrylate polymer is Rheovis® AT 120, which is commercially available from BASF.

Other suitable thickeners are hydroxethylcelluloses (HM-HEC) preferably hydrophobically modified hydroxyethylcellulose. Suitable hydroxyethylcelluloses (HM-HEC) are commercially available from Aqualon/Hercules under the product name Polysurf 76® and W301 from 3V Sigma. Xanthan gum is one suitable thickener used herein. Xanthan gum is a polysaccharide commonly used rheoligy modifier and stabilizer. Xanthan gum is produced by fermentation of glucose or sucroce by the *xanthomonas campestris* bacterium. Suitable Xanthan gum is commercially available under trade anem Kelzan T® from CP Kelco. Hydrogenated castor oil is one suitable thickener used herein. Suitable hydrogenated castor oil is available under trade name THIX-CIN R from Elementis. The most preferred thickener used herein is a modified methacrylic acid/acrylic acid copolymer Rheovis® AT 120, which is commercially available from BASF. When used, the composition may comprise from 0.1% to 10.0% by weight of the total composition of said thickener, preferably from 0.2% to 5.0%, more preferably from 0.2% to 2.5% and most preferably from 0.2% to 2.0%.

Chelating Agent:

The cleaning composition can comprise a chelating agent or crystal growth inhibitor. Suitable chelating agents, in combination with the surfactant system, may improve the shine benefit. Chelating agent can be incorporated into the compositions in amounts ranging from 0.05% to 5.0% by weight of the total composition, preferably from 0.1% to 3.0%, more preferably from 0.2% to 2.0% and most preferably from 0.2% to 0.4%. Suitable phosphonate chelating agents include ethylene diamine tetra methylene phosphonates, and diethylene triamine penta methylene phosphonates (DTPMP). The phosphonate compounds may be present either in their acid form or as salts of different cations on some or all of their acid functionalities. Preferred phosphonate chelating agent to be used herein is diethylene triamine penta methylene phosphonate (DTPMP). Such phosphonate chelating agents are commercially available from Monsanto under the trade name DEQUEST®.

A preferred biodegradable chelating agent for use herein is ethylene diamine N,N'-disuccinic acid, or alkali metal, or alkaline earth, ammonium or substitutes ammonium salts thereof or mixtures thereof. Ethylenediamine N,N'-disuccinic acids, especially the (S,S) isomer have been extensively described in U.S. Pat. No. 4,704,233, Nov. 3, 1987, to Hartman and Perkins. Ethylenediamine N,N'-disuccinic acids is, for instance, commercially available under the tradename (S,S)EDDS® from Palmer Research Laboratories. Most preferred biodegradable chelating agent is L-glutamic acid N,N-diacetic acid (GLDA) commercially available under tradename Dissolvine 47S from Akzo Nobel.

Suitable amino carboxylates for use herein include ethylene diamine tetra acetates, diethylene triamine pentaacetates, diethylene triamine pentaacetate (DTPA), N-hydroxyethylethylenediamine triacetates, nitrilotriacetates, ethylenediamine tetrapropionates, triethylenetetraaminehexa-acetates, ethanoldiglycines, and methyl glycine diacetic acid (MGDA), both in their acid form, or in their alkali metal, ammonium, and substituted ammonium salt forms. Particularly suitable amino carboxylate to be used herein is propylene diamine tetracetic acid (PDTA) which is, for instance, commercially available from BASF under the trade name Trilon FS® and methyl glycine di-acetic acid (MGDA). Most preferred aminocarboxylate used herein is diethylene triamine pentaacetate (DTPA) from BASF. Further carboxylate chelating agents for use herein include salicylic acid, aspartic acid, glutamic acid, glycine, malonic acid or mixtures thereof.

Suitable fatty acids include the alkali salts of a $C_8$-$C_{24}$ fatty acid. Such alkali salts include the metal fully saturated salts like sodium, potassium and/or lithium salts as well as the ammonium and/or alkylammonium salts of fatty acids, preferably the sodium salt. Preferred fatty acids for use herein contain from 8 to 22, preferably from 8 to 20 and more preferably from 8 to 18 carbon atoms. Suitable fatty acids may be selected from caprylic acid, capric acid, lauric acid, myristic acid, palmitic acid, stearic acid, oleic acid, and mixtures of fatty acids suitably hardened, derived from natural sources such as plant or animal esters (e.g., palm oil, olive oil, coconut oil, soybean oil, castor oil, tallow, ground oil, whale and fish oils and/or babassu oil. For example coconut fatty acid is commercially available from KLK OLEA under the name PALMERAB1211.

Typically, the composition may comprise up to 6.0% by weight of the total composition of said fatty acid, preferably from 0.1% to 3.0%, more preferably from 0.1% to 2.0% and most preferably from 0.15% to 1.5% by weight of the total composition of said fatty acid. Typically, the liquid hard surface cleaning composition may comprise up to 2.0% by weight of the total composition of said branched fatty alcohol, preferably from 0.10% to 1.0%, more preferably from 0.1% to 0.8% and most preferably from 0.1% to 0.5%.

Perfumes:

The compositions preferably comprise a perfume. Suitable perfumes provide an olfactory aesthetic benefit and/or mask any "chemical" odour that the product may have.

Biocides:

Whilst the polymers essential to the invention are preferably used in the absence of biocide, the compositions may comprise a biocidally-active amount of a biocide. A biocide is any known ingredient having the ability of reducing or even eliminating by killing or removing the micro-organisms existing on a surface. Biocides useful herein include, guanidines, phenolic compounds, heavy metal salts, fungicides, algaecides and mixtures thereof. Quaternary surface active biocides such as benzalkonium chloride, benzethonium chloride, cetyl pyridinium chloride, sodium tetradecyl sulfate, sichlorobenzalkonium chloride, methylbenzethonium chloride, cetyl dimethyl ethyl ammonium bromide. Exemplary guanidines include chlorohexidine hydrochloride, chlorohexidine gluconate, dodecylguanidine hydrochloride, polyhexmethylenebiguanidine hydrochloride, and 6-acetoxy-2,4-dimethylmetadioxane. Exemplary phenolic compounds include cresol, resolcinols and related compounds, phenol; substituted phenols-cresols, meta-cresylacetate, creosote, quaiacol, resorcinol, hexylresorcinol, pyrogallol, thymol, thymol iodide, chlorinated phenols-dichlorophene, hexachlorophene, tars. Exemplary halogens and halogen-containing compounds include iodine and iodoform. Exemplary oxidizing agents include potassium permanganate, zinc permanganate, potassium chlorate. Exemplary heavy metal salts include mercuric chloride, miscellaneous ionizable mercuric salts, organic mercurials, silver nitrate, silver lactate, silver picrate, silver proteins, silver halides, zinc oxide, zinc stearate, copper sulfate and organic tin derivatives. Exemplary essential oils are thyme oil, clove oil, cinnamon oil, geranium oil, *eucalyptus* oil, peppermint oil, citronella oil, ajowan oil, mint oil or mixtures thereof. Other useful biocide herein includes furan derivatives, nitrofurantoin, sulfur, sulfur dioxide, ichthamol, chrysarobin, anthralin, betanaphthol, balsams, volatile oils, chlorophyl.

Use/Method of the Composition Comprising Polymer/Solvent:

The composition comprising the polymer/solvent, may be applied to the surface to be treated by any application means such as by coating, dipping, spraying, painting or in a cleaning or washing step. It may be applied, for example directly as a concentrated product or by diluting the composition to a dilution level of from 0.1% to 2% by volume, and applying the diluted composition to the surface to be treated. The cleaning composition may be diluted to a level of from 0.3% to 1.5% by volume, or from 0.4% to 0.6% by volume. The dilution level is expressed as a percent defined as the fraction of the liquid hard surface cleaning composition, by volume, with respect to the total amount of the diluted composition. For example, a dilution level of 5% by volume is equivalent to 50 ml of the liquid hard surface cleaning composition being diluted to form 1000 ml of diluted composition.

The composition can be applied using a mop, sponge, or other suitable implement. The copolymer or composition can be applied diluted or directly as a concentrated product without undergoing any significant dilution i.e. "neat" to the surface to be treated. By significant dilution, what is meant is that the composition is diluted by less than 10 wt %, preferably less than 5 wt %, more preferably less than 3 wt %. Such dilutions can arise from the use of damp implements to apply the composition to the surface, such as sponges which have been "squeezed" dry. In a preferred embodiment of the present invention said surface is inclined or vertical. Inclined or vertical hard surfaces include mirrors, lavatory pans, urinals, drains, waste pipes and the like.

In a preferred application method the composition may be applied by spraying the composition onto the surface. Following application of the composition on the surface being treated, the copolymer is typically then allowed to act on the surface for a period of time, with or without applying mechanical action. The treated surface is then optionally rinsed with water and/or wiped with an appropriate instrument, e.g., a sponge, a paper or cloth towel and the like.

The composition can be applied to the surface via a wipe or pad. Such wipes and pads can be particularly suitable for cleaning surfaces, such as found in the household, automotive surfaces such as car glass, and the like. Suitable wipes can be fibrous. Suitable fibrous wipes can comprise polymeric fibres, cellulose fibres, and combinations thereof. Suitable cellulose-based wipes include kitchen wipes, and the like. Suitable polymeric fibres include polyethylene, polyester, and the like. Polymeric fibres can be spun-bonded to form the wipe.

The method/use of the present invention can also be for: reducing soil adhesion and/or accumulation, since reduction in biofilm leads to reduced soil and dust adhesion; for increasing the ratio of cohesion between micro-organisms to adhesion of the microorganisms to the surface; reducing staining since the EPS can serve as a support for coloured stains or even coloured micro-organisms and/or microorganism bi-products; reducing allergens; reducing scale build up; reducing malodour; and/or reducing stickiness and increasing cleaning of surfaces by reduction/removal of biofilm.

Methods:

A) pH Measurement:

The pH is measured on the neat composition, at 25° C., using a Sartarius PT-10P pH meter with gel-filled probe (such as the Toledo probe, part number 52 000 100), calibrated according to the instructions manual.

The invention may be made according to any of the following non-limiting combinations.

A. A method for reducing adhesion of microorganisms and/or for reducing the development of biofilm on a surface and/or for increasing ease of cleaning of a biofilm from a surface, comprising the step of applying a composition to the surface wherein the composition comprises:
  (a) A hydrophobically modified cationic polymer having the formula:

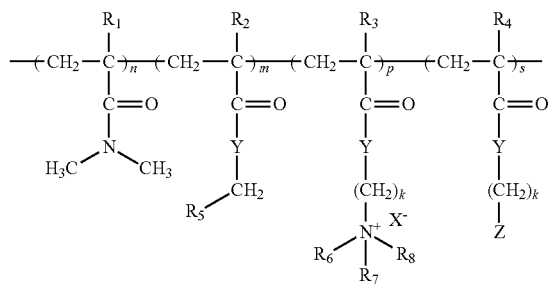

wherein:
  n, m, p, and s are the mole percent of the respective monomers, such that:
  n is from 95 to 99.5;
  m is from 0.5 to 5;
  p is from 0 to 4.5;
  s is from 0 to 4.5;
  $R_1$, $R_2$, $R_3$, and $R_4$ are independently H or $CH_3$;
  $R_5$ is an alkyl group from C7 to C21;
  $R_6$, $R_7$, $R_8$, are independently selected from the group consisting of: hydrogen and C1 to C4 alkyl;
  Y is independently O or NH;
  Z is silicone or a derivative thereof;
  k is independently from 1 to 18;
  $X^-$ is an anion, preferably $Cl^-$, $Br^-$, $I^-$, $HSO_4^-$, $CH_3SO_4^-$, $C_2H_5SO_4^-$, or $OH^-$;
  and
  (b) a solvent.

B. A method according to paragraph A, wherein the hydrophobically modified cationic polymer has a molecular weight of less than 1,500,000 Daltons, preferably from 100,000 to 500,000 Daltons.

C. A method according to paragraph A or B, wherein in the hydrophobically modified cationic polymer, n is from 96.5 to 99.5.

D. A method according to paragraph A or B or C, wherein in the hydrophobically modified cationic polymer, m is from 0.5 to 2.

E. A method according to paragraph A or B or C or D, wherein in the hydrophobically modified cationic polymer, p is from 0.5 to 3.

F. A method according to paragraph A or B or C or D or E, wherein in the hydrophobically modified cationic polymer, n is form 96.5 to 99.5, m is from 0.5 to 2, p is from 0.5 to 3.

G. A method according to any of paragraphs A to F, wherein in the hydrophobically modified cationic polymer, s is 0.

H. A method according to any of paragraphs A to G, wherein in the hydrophobically modified cationic polymer, $R_5$ is an alkyl group from C16 to C20, more preferably C18.

I. A method according to any of paragraphs A to H, wherein in the hydrophobically modified cationic polymer, $R_6$ is H, and $R_7$, $R_8$, are independently selected from the group consisting of: methyl, ethyl, and propyl.

J. A method according to any of paragraphs A to E or F to I, wherein in the hydrophobically modified cationic polymer, Z is a silicone or derivative selected from the group consisting of a polydimethylsiloxane, an aminosilicone, a cationic silicone, a silicone polyether, a cyclic silicone, a fluorinated silicone and mixtures thereof, preferably polydimethylsiloxane.

K. A method according to paragraph J, wherein Z is a silicone or derivative having a molecular weight of from 250 to 40,000, preferably 500 to 20,000, more preferably 1,000 to 10,000 Da.

L. A method according to any of paragraphs A to K wherein the composition comprises from 0.05 to 5 by weight of the composition of the polymer.

M. A method according to any of paragraphs A to L wherein the solvent is selected from alkylene glycol ethers and mixtures thereof.

N. A method according to the preceding paragraph wherein the copolymer and the solvent are in a weight ratio of about 2:5 to 1:10.

O. A method according to any of paragraphs A to N preceding claim wherein the solvent is present in an amount from 0.1 to 5 by weight of the composition.

P. A method according to any of paragraphs A to 0 wherein the composition further comprises a surfactant.

Q. A method according to any of paragraphs A to P wherein the solvent is present in an amount from 0.1 to 5 by weight of the composition.

R. A method according to any of paragraphs A to Q wherein the composition is a hard surface cleaning composition.

S. Use of a composition as defined in any of paragraphs A to R reducing adhesion of microorganisms and/or for reducing the development of biofilm on a surface and/or for increasing ease of removal of a biofilm from a surface.

EXAMPLES

Example 1

Non-Limiting Synthesis Example for Polymers Suitable for Use in the Compositions of the Present Invention:

An example of a polymer of use in compositions of the present invention is made as follows. Into a reaction vessel, place the monomers selected from: N,N, dimethyl acryl amide (NDMAAM N, N-dimethylacrylamide available from Aldrich, n-octadecyl acrylamide (ODAA available from Polysciences), dimethyl aminopropylmethacrylate (DMAPMA available from Aldrich) and solvent (ethyl acetate available from EMD Chemicals is used as the solvent for all the samples) in the amounts listed in Table 1 below.

The reaction vessel is closed and heated to the temperature (Reaction Temp ° C.) also listed in Table 1 below. Once at temperature, the reaction vessel is opened and the contents are sparged with an inert gas, such as but not limited to nitrogen or argon, for approximately four minutes utilizing a fritted gas dispersion tube. During the sparge, a free radical initiator V-67 (2,2'-azobis(2-methylbutyronitrile) available from DuPont) or V-70 (2,2'-azobis(2,4-dimethyl-4-methoxyvaleronitrile) available from Wako) is added to the reaction vessel. Except for Sample 2, the free radical initiator used is V-67. Sample 2's free radical initiator is V-70.

The amount of free radical initiator is set forth in Table 1 below. The free radical initiator is added at approximately ½ sparge time to ensure the free radical initiator also undergoes some sparge. The contents are then sealed and kept at the temperature previously listed in Table 1 below for a time also listed in Table 1 below. After the elapsed time (Reaction Time), the resulting polymer solution is cooled to 23° C.±2.2° C. then precipitated in a co-solution of ethyl acetate and hexanes from 40% to 80% ethyl acetate, such as 50% ethyl acetate and 50% hexane by volume. The precipitate is isolated from the solvent mixture and dried. Once dried the product can be used as is or can be dissolved in solvent system of choice per application. The solvent may be water. The reaction is completed such that less than 100 ppm of the monomers remain unreacted. The weight average molecular weight of the resultant polymers was from 100,000 to 500,000 Daltons.

minutes or until needed for use. The solvent control wells (6 for each) were modified concurrently and in the similar manner with the solvent only that was used to formulate surface modification product.

Biofilm Growth Assay

A "wild type" biofilm culture suspension previously collected from a glass shower door was used to inoculate modified test surfaces and positive wells of the 96-well plate. Individual wells were inoculated with 20 μL of the "wild type" biofilm culture suspension. Then 80 μL of either minimal media (Mueller Hinton Broth) or Trypticase Soy Broth—Cat. No. G82 (Hardy Diagnostics, Santa Maria, Calif.) was added to each well. The plate was incubated overnight (18 hours) at 25° C. To the negative wells 100 μL of minimal media was added (no biofilm culture suspension). After 18-24 hours, the biofilm is 1-day old and to achieve a 2-day old biofilm about 100 μL was drawn from each well with 1-day old biofilm and replaced with fresh

TABLE 1

Monomer levels and reaction variables to produce the polymers of use in the present invention.

| Polymer | Monomer 1 | Monomer 1 (g) | Monomer 2 | Monomer 2 (g) | Monomer 3 | Monomer 3 (g) | Solvent (g) | Initiator (g) | T ° C. | Rxn Time (hours) |
|---|---|---|---|---|---|---|---|---|---|---|
| 1 | NDMAAM[1] | 9.7 | ODAA[2] | 0.1 | DMAPMA[3] | 0.2 | 50 | 0.2 | 60 | 24 |
| 2 | NDMAAM[1] | 9.91 | ODAA[2] | 0.11 | DMAPMA[3] | — | 50 | 0.2 | 60 | 24 |

[1]N,N,dimethyl acryl amide
[2]n-octadecyl acrylamide
[3]dimethyl aminopropylmethacrylate

TABLE 2

The resultant polymers had the following weight molar percentage composition:

| Polymer | Monomer 1 | Wt % | Monomer 2 | Wt % | Monomer 3 | Wt % |
|---|---|---|---|---|---|---|
| 1 | NDMAAM[1] | 97 | ODAA[2] | 1 | DMAPMA[5] | 2 |
| 2 | NDMAAM[1] | 99 | ODAA[2] | 1 | DMAPMA[5] | — |

[1]N,N,dimethyl acryl amide
[2]n-octadecyl acrylamide
[3] dimethyl aminopropylmethacrylate Biofilm Removal Evaluation Compositions comprising the copolymer and solvent according to the invention were prepared (Products 1 to 6) to evaluate the removal of biofilm using microtiter plates as detailed herein below. They were compared with compositions comprising only the solvent (Products 7 to 9) or water (Product 10).

Microtiter Surface Modification

To cover the entire microtiter well surface area, about 300 μL of product was added to each well (n=6) of sterile corning 96-well microtiter plates (VWR Int, West Chester, Pa.) and held for 10 min to pre-condition the microtiter plate test wells. In the designated positive and negative wells, de-ionized sterile water was used to pre-condition the wells unless otherwise stated. After 10 minutes, the wells were emptied and replenished with fresh 300 μl of product for the test wells and with 300 μl de-ionized water for positive and negative wells. The plate was set aside for another 5-10 minutes to equilibrate at room temperature. After 10 minutes, the microtiter wells were emptied and the plate was inverted over a sterile dry paper towel and tapped gently to drain all the surface modifying solution. The plate was placed inverted in an incubator set at 25° C. to dry for 30 minutes or until needed for use. The solvent control wells (6 for each) were modified concurrently and in the similar manner with the solvent only that was used to formulate surface modification product.

minimal media followed by another 18-24 hours of incubation. After 36-48 hours, the wells were emptied and the plate was inverted over a sterile dry paper towel and tapped gently to drain all the solution followed by rinsing twice with de-ionized sterile water to remove non-adherent and biofilm and planktonic bacterial cells. After the second and final rinse the plate was inverted over a sterile dry paper towel and tapped gently to drain all the rinsing solution and placed inverted in an incubator set at 28±2° C. to dry for 30 minutes.

Biofilm Quantification

To each well, 100 μl of 0.1% w/v Resazurin sodium salt was added (Alamar Blue Dye)—Cat 199303-5G (Sigma Aldrich, St. Louis, Mo.) to by directly quantitated the biofilm adhering to the surface. The microtiter plate was incubated at room temperature in the absence of light for >3 hours to develop a readable fluorescent signal. The fluorescent signal was read out from SpectraMax (M3) multimode plate reader (serial # MT05589) ($\lambda$ex=540 nm/$\lambda$em=585 nm) at 25° C. The fluorescent signal from the Alamar blue reagent is proportional to the level of biofilm left on the surface of the well (linear relationship between residual biofilm on surface and fluorescence signal intensity). The greater fluorescence signal indicates a color change (pink) and higher residual metabolic activity (higher biofilm levels) present on the surface. A lower fluorescence signal (blue) depicts higher biofilm removal for the specific surface modification formulation. The % removal was normalized relative to positive control fluorescent counts calculated from unmodified microtiter wells to determine the surface modification impact of the product.

TABLE 1

Table 1. Tests performed with two different kinds of compositions. Products 1 to 6 comprise compositions according to present invention. Product 7 to 9 comprise solvent only. Product 10 is a composition of sterile, de-ionized water (nil-polymer, and nil-solvents)

| Ingredients | Product 1(wt %) | Product 2(wt %) | Product 3(wt %) | Product 4(wt %) | Product 5(wt %) | Product 6(wt %) | Product 7(wt %) | Product 8(wt %) | Product 9(wt %) | Product 10 |
|---|---|---|---|---|---|---|---|---|---|---|
| Polymer 1 | 0.1 | 0.1 | 0.1 | — | — | — | — | — | — | — |
| Polymer 2 | — | — | — | 0.1 | 0.1 | 0.1 | — | — | — | — |
| Propylene glycol n-butyl ether (PnB) | 0.5 | 1.0 | 3.0 | 0.5 | 1.0 | 3.0 | 0.5 | 1.0 | 3.0 | — |
| Water | To 100 | To 100 | To 100 | To 100 | To 100 | To 100 | To 100 | To 100 | To 100 | To 100 |

TABLE 2

Table 2. Records the results of the percentage of the biofilm from surfaces modified with Products 1 to 6, in comparison to percentage of the biofilm from unmodified surfaces (Product 10). Products 7 to 9 are solvent only control.

| | Product 1 | Product 2 | Product 3 | Product 4 | Product 5 | Product 6 | Product 7 | Product 8 | Product 9 | Product 10 |
|---|---|---|---|---|---|---|---|---|---|---|
| % Biofilm measured on the surface | 43.0 ± 8.7 | 45.0 ± 8.0 | 43.4 ± 5.5 | 49.6 ± 5.5 | 54.8 ± 8.6 | 53.0 ± 2.0 | 79.1 ± 1.6 | 93.7 ± 1.8 | 166.7 ± 12.8 | 100 ± 1.1 |
| % Biofilm removed from surface in comparison to Control (Product #10) | 57.0 | 55.0 | 56.6 | 50.4 | 45.2 | 47.0 | 20.9 | 6.3 | (−66.7) | 0.0 |

The data in the Table 2 shows that improved ease of biofilm removal is observed on surfaces modified with Products 1 to 6 (compositions according to the invention) in comparison to the surface modified with Products 7 to 10 comprising nil-polymer or nil-solvent. Surprisingly, the combination of polymer, and solvent allows for improved biofilm removal according to the method of the invention.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for reducing adhesion of microorganisms and/or for reducing the development of biofilm on a surface and/or for increasing ease of cleaning of a biofilm from a surface, comprising the step of applying a composition to the surface wherein the composition comprises:
   (a) A hydrophobically modified cationic polymer having the formula:

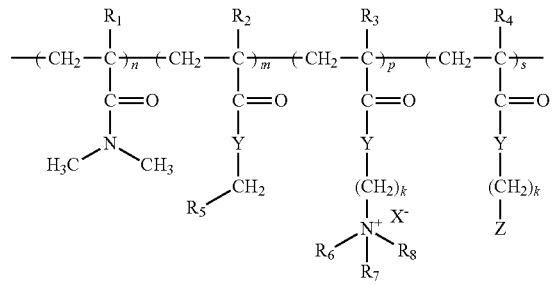

wherein:
n, m, p, and s are the mole percent of the respective monomers, such that:
n is from 96.5 to 99.5;
m is from 0.5 to 2;
p is from 0.5 to 3;
s is from 0;
$R_1$, $R_2$, $R_3$, and $R_4$ are independently H or $CH_3$;
$R_5$ is an alkyl group from $C_{16}$ to $C_{20}$;
$R_6$, $R_7$, $R_8$, are independently selected from the group consisting of: hydrogen and $C_1$ $C_4$ alkyl;
Y is independently O or NH;
Z is polydimethylsiloxane;
k is independently from 1 to 18;

X⁻ is an anion, preferably $Cl^-$, $Br^-$, $I^-$, $HSO_4^-$, $CH_3SO_4^-$, $C_2H_5SO_4^-$, or $OH^-$;

and (b) a solvent.

2. The method according to claim 1, wherein the hydrophobically modified cationic polymer has a molecular weight of from 100,000 to 500,00 Daltons.

3. The method according to claim 1, wherein in the hydrophobically modified cationic polymer, $R_5$ is $C_{18}$.

4. The method according to claim 1, wherein in the hydrophobically modified cationic polymer, $R_6$ is H, and $R_7$, $R_8$, are independently selected from the group consisting of: methyl, ethyl, and propyl.

5. The method according to claim 1 wherein the composition comprises from 0.05 to 5 by weight of the composition of the polymer.

6. The method according to claim 1 wherein the solvent is a alkylene glycol ether.

7. The method according to claim 1 wherein the solvent is selected from alkylene glycol ethers and mixtures thereof and wherein the copolymer and the solvent are in a weight ratio of about 2:5 to 1:10.

8. The method according to claim 1 wherein the solvent is present in an amount from 0.1 to 5 by weight of the composition.

9. The method according to claim 1 wherein the composition further comprises a surfactant.

10. The method according to claim 1 wherein the solvent is present in an amount from 0.1 to 5 by weight of the composition.

11. The method according to claim 1 wherein the composition is a hard surface cleaning composition.

* * * * *